United States Patent

[11] 3,628,965

| [72] | Inventor | Adolf Maurits Nijkerk |
| | | Bussum, Netherlands |
| [21] | Appl. No. | 794,066 |
| [22] | Filed | Jan. 27, 1969 |
| [45] | Patented | Dec. 21, 1971 |
| [73] | Assignee | Weiner & Co. N.V. |
| | | Amsterdam, Netherlands |
| [32] | Priority | Jan. 26, 1968 |
| [33] | | Great Britain |
| [31] | | 4,275/68 |

[54] PROCESS AND APPARATUS FOR PRODUCING CHOCOLATE
12 Claims, 6 Drawing Figs.

| [52] | U.S. Cl. | 99/23, 99/236 CC |
| [51] | Int. Cl. | A23g 1/00 |
| [50] | Field of Search | 99/23, 26, 236 CC |

[56] References Cited
UNITED STATES PATENTS

| 2,070,558 | 2/1937 | Beck | 99/236 X |
| 3,395,020 | 7/1968 | Chozianin et al. | 99/23 |
| 3,506,461 | 4/1970 | Noschinski et al. | 99/236 |
| 2,558,128 | 6/1951 | Edwards | 99/23 |

*Primary Examiner*—Lionel M. Shapiro
*Assistant Examiner*—D. M. Naff
*Attorney*—Gordon C. Mack

ABSTRACT: Process and apparatus for mixing material and diminuting components thereof. The process is a cyclical one in which in each of the recurring cycles the material is passed consecutively through mixing and diminuting means and during cycling is spread into film or sheet form and at least one fluid is incorporated into the filmed or sheeted material. The fluid may be a gaseous medium. The introduction of the gaseous medium causes the removal of unwanted volatile constituents and in edible materials has a taste-changing effect.

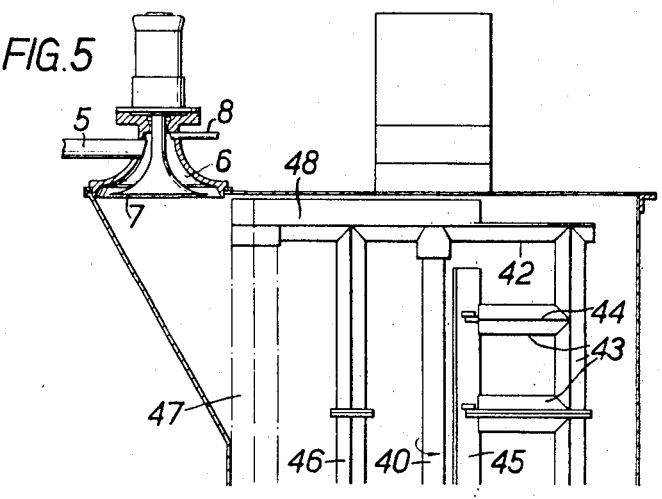
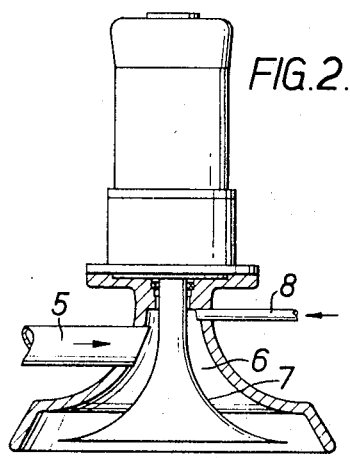
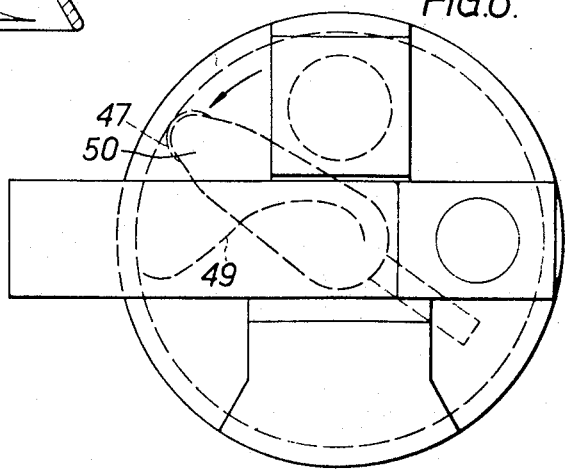

PROCESS AND APPARATUS FOR PRODUCING CHOCOLATE

The present invention relates to a process and installation for mixing material and diminuting components thereof, e.g., material in which solid particles are required to be diminuted and dispersed in a liquid or liquifiable phase. The invention is suitable for the production of edible products or foodstuffs and it may be adapted for developing taste or flavor in edible materials. However although the invention will be more particularly described in the connection it is applicable in its broader aspects to the processing of nonedible materials.

It is well known that the development of a certain taste or flavor characteristic of certain edible products, almost solely depends on the grade of diminution and the homogeneous blending or mixing of the constituents and the removal of certain unwanted volatile constituents. These conditions are absolutely essential if the product contains one or more vegetable substances such as cocoa beans or nuts which are rich in fats or oils. In order to create a desired taste pattern, suitable ingredients such as sugar, milk powder, herbs, flavours, fragrance, etc. can be mixed and the mixture then blended with roasted nuts or beans, suitably broken down or crushed, so that the desired final taste can be obtained. This is the case, for instance, in the production of all kinds of chocolates. Cocoa beans consist of various constituents, partly in the solid state and partly in the liquid state at sufficiently higher temperature, as when chocolate melts on the tongue. Certain methods of grinding and blending will be applied depending on the dispersion properties of the constituents. The most common method is to diminute the solid ingredients of chocolate, such as sugar and cocoa beans. As soon as these ingredients have reached their desired fineness they are thoroughly mixed in appropriate proportion, in order to obtain a final product with a certain taste pattern. The attainment thereof is facilitated by the use of modern mixing, kneading blending and grinding machines. The sugar is usually ground in a centrifugal or pin mill with air separation: the cocoa beans for example in fast running mills having balls as grinding media or in mills comprising grinding stones or plain grinding rolls. The mixers produce active agitation to promote homogeneity of the product without the separation of aqueous constituents which often are present in roasted nibs by added water; and emulsion with thixotropic tendency develops which gives a special character to the product. The known methods however have many shortcomings; for example the taste pattern does not satisfactorily develop. A classical example can be found in chocolate production. Regardless of the kind of chocolate being produced, it is necessary to re-treat the mixture after premixing and grinding to what is known as the conching process.

The conching process promotes the elimination of constituents which militate against obtaining the taste or flavor required and the development of the taste of flavor according to the characteristics of the constituents of the material. Such a production cycle demands the application of various types of blending, kneading, mixing, grinding and conching machines. During its passage through those machines constituents of the material change at different times from solid to liquid state.

The grinding machine usually employed is a five-roller mill, which crushes a mixture, by preference a stiff mixture, of sugar powder (preground sugar from a specially designed mill), cocoa liquor, milk powder and possibly added fat or cocoa butter all coming from a kneading machine in which a so-called agglomeration takes place or a dry blending machine. This mill diminutes the mixture under the pressure and differential speed of the rolls. A roll scraper takes off the mixture in a practically dry condition as a result of the intensive milling effect and the butter or other fats absorbed by the sugar. The mixture containing diminuted particles is then charged into a conch, e.g., one having a reciprocating roll, or rolls, rolling on a granite bottom of a suitable trough containing the material or having a roll, or rolls, orbiting in rolling engagement with a suitable surface in the vessel containing the material, usually while the material is being stirred, squashing the material against the said bottom or cooperating surface. It may on occasion also be squeezed through slits or ports which are provided in some conches. Under the influence of the cocoa liquor and the added butter or fats, the smoothness and homogeneity of the constituents will be promoted and the already mentioned simultaneous removal of constituents which militate against the required taste or flavor will be accomplished. If any still detectable sugar crystals are present they will be further polished down and encased in a fatty environment until an entire integration takes place of the sugar, milk, cocoa particles and other ingredients by means of the existing fatty ingredients.

The five-roller mill can be substituted by a mill with agitated balls, particular if the fatty constituents present are high than 32 percent of the total mass. Such a mill needs less space, less electrical motive power and lower initial capital layout. Methods are known to exist whereby even mixtures of a lower fat content, under 32 percent, have been produced in this way.

The present invention provides a cyclical process of mixing a material and diminuting components thereof, in which in each of the recurring cycles the material is passed consecutively through mixing and diminuting means and during cycling is spread into film or sheet form and receives a separate fluid or fluids to be incorporated into the material. The fluid may be in the gaseous form, e.g., air. Thus solid particles in a liquid phase of the material may be progressively diminuted by successive passes of the material through the diminuting apparatus each followed by mixing and the inclusion of the separate fluid or fluids.

The diminuting apparatus preferably comprises a mass of spherical or other suitable discrete elements maintained in a state of agitation while the material is passing through the mass and a particularly favorable form of apparatus suitable for carrying out the present process is that described and claimed in the specification of British Pat. No. 1,002,556 (corresponding to U.S. Pat. No. 3,149,789), i.e., where the material can continuously enter the bottom of the vessel containing the mass of elements and rise in the vessel to a top screened outlet. The vessel of such an apparatus and the mixing vessel or vessels can be readily embodied in a circulatory system, if desired one with two or more mixing vessels discharging in succession to the inlet of the diminuting vessel and flow through that vessel can be continuous or substantially so throughout the cyclic process while mixing is simultaneously taking place elsewhere in the circuit.

In a simple form of apparatus for carrying out the process a mixing vessel and a diminuting vessel are arranged in a closed circuit so that the material can continuously circulate from one to the other and this can proceed for the necessary length of time before the treated material is drawn off. The mixing vessel may also be used as a premixing vessel, i.e., a batch of the constituents for the product may first be premixed before circulation commences and the vessel later serve as a vessel in the circulatory system.

It is however preferred to mix the material in a first (premixing) vessel before circulation commences and then to circulate the material from this vessel through the diminuting vessel to another mixing vessel and then in the return direction through the diminuting vessel back to the first vessel and so on. In this way the respective mixing vessels can be substantially emptied and recharged each time with material which has just passed through the diminuting vessel and uniformity of treatment is promoted.

Even more is it preferred to provide two mixing vessels in conjunction with a diminuting vessel in the circulatory system and to provide a premixing vessel in which a batch of material may first be premixed and then delivered to one of the other mixing vessels for circulation in the circulatory system.

In carrying out the process the said separate fluid or fluids may be introduced at an appropriate part or parts of the circuit, e.g., for producing a heterogeneous reaction with the material and/or for producing a stripping action as by the introduction of a gaseous medium, such as air, for removing unwanted volatile constituents in the material.

At such a part or parts of the circuit the material may be spread into the sheet or film on a spinning surface and the separate medium delivered onto the said sheet or film. The material may be spread on its way from the diminuting apparatus to the or a mixing zone. The spinning surface may be disposed at the entry zone of the mixing apparatus and where two or more mixing apparatus are included in the circuit each may be provided with such a surface.

There are many materials to which such an addition medium may be desirable e.g., in the production of carbon-paper dopes an air phase is useful for stripping moisture from a wax-carbon black material. An addition medium may be required for removing moisture or acid or other material or to obtain some chemical action such as an oxidizing action.

The process is nevertheless very suitable for the manufacture of edible products of various kinds and particularly for the manufacture of confectionery or like sugar products, especially chocolate. In this connection, when an air or inert volatile fluid phase is introduced, remarkable effects on the taste or flavor of the chocolate can be produced and such technical and economical advantages are obtainable that it is considered that the invention as compared with previous methods and apparatus for achieving taste and flavor is a radical departure.

Suitable provision may be made for heating the material, e.g., to a constant temperature, and if desired pumps and pipes used for the circulation of the material and the vessels may be kept heated although cooling means may be provided for lowering the temperature if and when this rises beyond the temperature desired. The addition medium may be introduced in heated form.

In order that the invention may be the more readily understood, different apparatus for carrying out the process by way of example for the production of chocolate, are diagrammatically illustrated in the accompanying drawings, in which:

FIG. 2 shows a device which is incorporated therein;

FIG. 5 shows a suitable mixing vessel. The premixer, even when not a part of the circulatory system, may have a similar stirring mechanism;

FIG. 6 is a plan view of another vessel.

Figure 1:
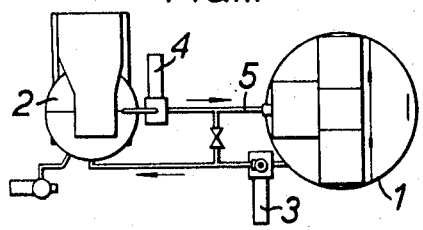
FIGS. 1, 3 and 4 show different embodiments.

The installation shown in FIG. 1 essentially comprises two vessels 1 and 2. The vessel 1 serves as a premixing vessel as well as a vessel which forms part of a circulatory system when carrying out the process, i.e., a predetermined batch can be premixed and then the circulation commences. The vessel receives the constituents to form the chocolate, e.g., granulated sugar, precrushed cocoa beans or cocoa liquor, milk powder and cocoa butter, and the constituents are well mixed while heated to produce a pulpable mixture. For the best results, the stirrer is designed to rotate and scrape against the internal surface of the wall of the vessel and in addition to act to raise the heavier constituents of the mix towards the surface and thus have a three dimensional action to promote a more uniform mix. During the working of the process, i.e., after the pumps have been set in operation following premixing, the positive displacement pump 3 will convey the material from the mixer to the vessel 2 and a positive displacement pump 4 returns the material after passing through the vessel 2 to the mixer by way of an inlet pipe 5 (see FIG. 2) which leads the material through a conical annular duct 6 on to the upper surface of a spinning member 7 running at relatively high speed, e.g., 200 r.p.m. The material is thus spread over the surface of the said member as a film or layer and peripherally discharged into the top of the mixing vessel. Pretreated air (heated and/or irradiated) is fed, e.g., at 4 inches water-column or less through the duct 8 onto the material on the spinning member 7 to aerate the material on the disc. In the vessel the aerated material is subjected to the mixing action aforesaid and is then pumped back to the vessel 2.

The vessel 2 may be substantially as described and illustrated in the Szegvari British specification Pat. No. 1,002,556. It contains a mass of balls. They may for example be steel balls of ¼ inch to ⅜ inch in diameter, and preferably of an alloy steel to prevent paste contamination by a catalytic effect of the carbon in normal hardened steel balls. Other balls such as ceramic balls may be used.

The material passes to and from the vessels in circulatory motion and during its repeated passage through the vessel 2 the air bubbles present in the material are micronized or broken up and energized by the agitation of grinding elements activated by the arms of the rotating agitator leading to the displacement and escape of moisture containing volatile constituents which would otherwise militate against the taste or flavor aimed at. Oxygen is liberated by micronization of the air bubbles introduced into the material and the remaining oxygen has a beneficial effect on the taste or flavor of the chocolate. Because of the repeated flow of the mass through the grinding vessel 2, the progressive diminution process can be accurately controlled and undesirable tacky characteristics can be obviated which would interfere with the taste analysis. The process according to the invention of making chocolate involves only low operating costs, shortens the production time considerably and improves the fast development of a desired favorable taste pattern.

Figure 3:
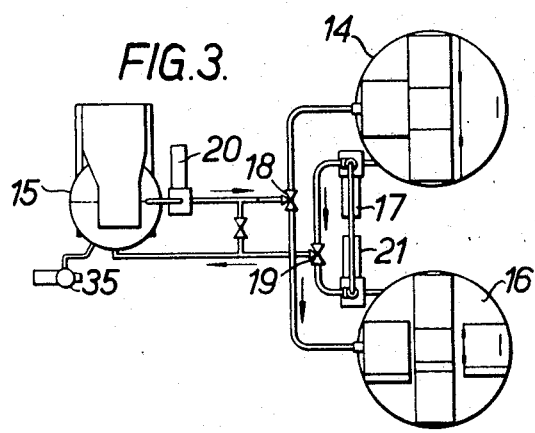

The installation shown in FIG. 3 comprises three vessels, the vessel 14 serving as a premixing vessel and subsequently as part of a circulatory system. A predetermined batch can thus be premixed in this vessel and then the circulation commenced. The vessels 15 and 16 are also in the circulatory system, the vessel 15 containing discrete grinding elements as described in relation to the vessel 2 aforesaid. The vessel 16, and if desired the vessel 14, may be constructed as described in relation to the vessel 1 aforesaid. Discharge may be by one of the pumps 17 or 21, e.g., by way of a three-way valve on the pump or pumps connected to a discharge line. Material is pumped from vessel 14 by pump 17 via valve 19 to vessel 15 and by pump 20 via valve 18 to vessel 16. It is pumped from vessel 16 by pump 21 via valve 19 to vessel 15 from which it is pumped by pump 20 via valve 18 to vessel 14. Timing of the pumps and valves may be such that one mixing vessel will substantially be emptied before recharging thereof commences. It is possible in certain cases that the required fineness may be reached before the desired taste or flavor has been obtained, and in that event by appropriately operating the valves, the material may be circulated between mixing vessels, e.g., the vessels 14 and 16, without passing through the grinding vessel but passing the spinning member with each reversal. It is also possible to discharge from the grinding vessel. When desired cleansing fluid may be pumped through the grinding vessel after suitably operating the valves of the system. Alternatively the batch of material may be premixed in the vessel 14 and then transferred to the circulatory system so that circulation is through the vessels 15 and 16. The premixed material may then be pumped by the pump 17 into the vessel 15 and then the valves 18 and 19 operated so that the pump 20 will pump the material to the vessel 16 and the pump 21 will return it to the vessel 15.

Figure 4:
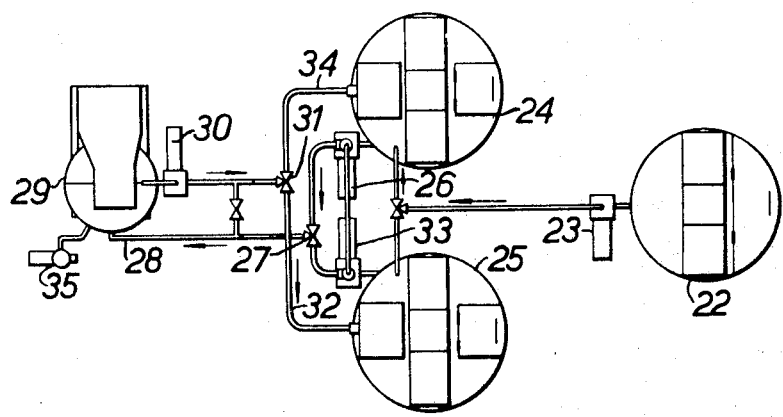

FIG. 4 shows a preferred embodiment comprising four vessels including a premixing vessel 22. A batch mixed in this vessel may be delivered by positive displacement pump 23 to one of the vessels 24 and 25 which are each constructed in the same manner as the vessel 1 previously referred to, i.e., with the air-introducing means and the three-dimensional mixing equipment. If the vessel 24 is charged, the material may be pumped therefrom by positive displacement pump 26 past valve 27 through line 28 to the grinding vessel 29 provided with the discrete grinding elements and agitating apparatus as described in relation to the vessel 2. Material having passed through the mass of grinding elements is then pumped by positive displacement pump 30 past valve 31 through line 32 to the vessel 25. Vessel 24 may be emptied and the material pumped by pump 33 from vessel 25 past valve 27 through line 28 to the vessel 29 and then by pump 30 past valve 31 and through line 34 back to the vessel 24. The flow may be again through 27 and 28 by pump 26 and this process continued for say 24 hours until the desired final condition has been attained as to fineness of particle size, homogeneity and especially the desired taste or flavor.

The material may continuously enter the bottom of the grinding vessel 29 and rise through the mass of grinding elements therein and flow out continuously from the top while the grinding elements are continuously kinetically activated by the rotating agitator, the activated elements by their momentum developing shearing forces which promote a grinding effect on the particles in the material, subdividing them and thus exposing fresh surfaces for the subsequent reaction.

The presence of the two aerating and mixing vessels 24 and 25 promotes greater certainty of the statistical grind progression in the diminution of the solid particles. It can be ensured that no material which has reached a certain stage of grinding mixes with material which has not attained that stage, and the total processing time may be shortened.

A suitable form of mixer, by way of example, equipped with an aerator device as shown in FIG. 2 is illustrated in FIG. 5, diagrammatically. The aerator is shown laterally offset at the top of the mixing vessel. The stirrer shaft 40 is suitably motor driven and comprises radiating arms 42 carrying vertical and radial agitator members 43 which may be constructed to present an edge 44 to the material, e.g., may be of rectangular section. The radial agitator members may be connected to a vertical agitator member 45 of angular form. A further vertical agitator member 46 is provided on the other side of the shaft and the stirrer carries round with it a helical member or screw 47 which is also rotated about its own axis off the main motor by gearing in a radial arm 48 of the stirrer. The helical member or screw acts to impart a motion to the material in a vertical direction so that the stirrer has a three-dimensional effect and it also acts as a scraper on the wall of the vessel. A spiral scraper may be provided. The aerated material leaves the spinning disc 7 peripherally to enter the top of the vessel. The premixer may have a similar stirrer device, although, when it is not used in the circulatory system, it will usually not be provided with an aerator.

FIG. 6 shows another form of mixer and aerating vessel where the aerator is disposed on top of the vessel as indicated by the spinner 7. In this case a spiral shaped scraper 49 may be provided. The mixer has a gear box arm 50 with a screw transmission.

The pumps may be driven by variable-speed geared motors and they may be such as to permit change in flow direction if necessary to avoid interruptions when the flow may cease by clogging or to remove quickly the remainder or residue of the material. The material is kept appropriately heated preferably at a temperature which may be approximately 55° C. The mixing and/or grinding vessels may be heated in suitable manner, e.g., may be jacketed for heating or at any appropriate stage for cooling. The pipe lines and the pumps may be heated. Cooling provision may be made so that it can be introduced at any time overheating may occur. Cleansing fluid may be circulated by the pumps whenever desired.

An apparatus such as is shown in FIG. 4 can be enlarged in capacity to, say, up to 10 times the throughput of the system particularly described by adding groups of three vessels 24, 25 and 29 and using a common premixer 22 of a desired capacity.

The frequency of passage through the column of grinding elements is dependent on the diminution resistance of the solid components of the material, e.g., due to their hardness or quantity in the material. It depends also upon the time for appropriate dispersion, upon the residential time of the material in flow through the grinding vessel, upon homogenizing tendency of the constituents of the material and finally upon biochemical reactions of the constituents of the material which determine the final taste pattern. Materials consisting of various constituents can be handled according to this invention, but it should be kept in mind that the size of the grinding elements determines the final fineness of the product. For instance the smaller grinding elements need a relatively high rotor speed which is a function of the size of the elements. The velocity and the movements should be chosen to avoid spinning the material around the grinding vessel. The forces should not be such as to have a detrimentally acting centrifugal force which would cause excessive wear, not only on the grinding elements, but also on the inner wall of the grinding vessel. With apparatus as described in British Pat. specification No. 1,002,536 aforesaid the active kinetic forces are effectively maintained. We have found satisfactory a rotor speed of between 20 r.p.m. and 100 r.p.m., e.g., we have worked successfully with rotors geared to rotate at approximately 25 r.p.m. or 80 r.p.m. where the stirrer shaft of the mixer or each mixer runs at 40 r.p.m. and the helical member or screw 45 rotates about its own axis at approximately 120 r.p.m. An average dwell time in the grinding vessel of the order of 15 to 20 minutes will serve. Continuous cycling may take place for 24 hours.

Excessive tackiness or undue increase in fineness of the constituents should be avoided as that may exclude physiological observations of taste patterns, and to this end the passage through the grinding vessel may be accelerated to reduce the grinding effect at any time pass. It is preferred to provide the rotating agitator of the grinding vessel with a variable-speed drive so that it can be controlled in accordance with the viscosity and behavior of the material during the flow through the grinding vessel. In order to prevent the grinding elements escaping from the grinding vessel with the treated material, a suitable screen is installed, e.g., a horizontally arranged mesh screen at the exit end of the vessel or the suction pipe of the pump which recirculates the material from the grinding vessel may be provided with a mesh screen.

Certain products and preferably those which have liquid constituents such as fats and butter, can, as the dispersion of solid particles continues, so increase in viscosity that their flow properties continuously worsen. This may give rise to stoppage or undue resistance to circulation. To avoid this, a small quantity of an agent, such as lecithin, capable of influencing the surface tension of the material may be introduced at a suitable position in the system, e.g., under the control of an adjustable metering device. Such a controller meter is indicate in FIGS. 3 and 4 at 35.

The operational cycle of the apparatus can easily be regulated. Excellent dispersion of the solid and liquid constituents of the heterogeneous mixture is possible and volatile constituents which affect the desired taste or flavor pattern can be readily removed.

Example: Production of 5600 lbs of milk chocolate by the apparatus FIG. 4.

The composition of the recipe is as follows:
1,470 lbs. refined, raw or granulated sugar, in a not yet precrushed form
1,710 lbs. roasted premixed cocoa beans
1,320 lbs. milk powder
1,100 lbs. cocoa butter.

After premixing in the vessel 22 and pumping the mixture to the first circulation vessel 24 the circulation through the three vessels 24, 25 and 29 continues for 24 hours for producing in one continuous process a chocolate mix suitable for making tablets or enrobing. The known, very popular and still applied method requires not only a kneading machine, a five-roller mill or an enclosed horizontal grinding drum with grinding arms for dispersing the constituents, but also a conch in order to fluidize the material and to assure at the same time a complete homogeneity and to develop the desired taste pattern. The method according to this invention is not only remarkably simpler, less expensive and more economical, but also more adequate in relation to the dispersion of the solid particles in the liquid, like the cocoa butter, and to achieve the desired taste or flavor more efficiently. It promotes faster discharge of the undesirable volatile constituents such as monocarbon acids, aldehydes, esters and ketones and accentuates the effect of the nonvolatile constituents such as the polyhydroxyphenols, the purines and the body flavor of the taninacid and so on. The stringent taste developes very well and surprisingly quickly. Since the viscosity is highly dependent upon the distribution curve of the dispersed solid particles and the reduction of the moisture content of the material a constant liquid material should be maintained by continuously circulating at a temperature which can be maintained constant. However the temperature can be decreased in the final stage and the polymorphe mono- and triglycerides of the palmitin and fatty acids can be precyrstallized in order to shorten this stage in the final conditioning of a product.

The whole installation may be automatic in operation with suitable control instruments and/or computer control.

What is claimed is:

1. A cyclical process of mixing and diminuting and reacting a heterogeneous flowable mixture of liquid and solid constituents used to manufacture chocolate, which process comprises passing the said mixture consecutively through stages of (1) mixing the mixture in a vessel by agitation and thereby rendering it more uniform, (2) passing the resulting mixture through a different vessel which contains a mass of discrete, substantially spherical grinding elements while kinetically activating these elements by rotating an agitator within said vessel and thereby diminuting the solid constituents therein and producing fresh surfaces thereof, and (3) producing a heterogeneous reaction at the interfaces between the solid and fluid constituents of said heterogeneous mixture by spreading the mixture into a film and incorporating air therein and removing volatile matter, and subsequently repeating all of said consecutive stages in succession whereby each stage gradually conditions the effectiveness of the following stage until the desired properties are obtained in the mixture.

2. The process of claim 1 in which, as an integral part of the process, in addition to being treated in all of said stages, the mixture while being cycled is not subjected to all of the mixing, diminuting and reacting stages, but only a part of said stages.

3. The process of claim 2 in which, as an integral part of the process, in addition to being treated in all of said stages, the mixture is cycled through the diminuting stage without being subjected to the mixing and reacting stages.

4. The process of claim 1 in which the constituents are passed through the various stages of the cycle consecutively, separately collected and the separately collected constituents are then passed through the stages of the cycle again.

5. A process of mixing and diminuting and reacting a heterogeneous flowable mixture of liquid and solid constituents used to manufacture chocolate, which process comprises passing said mixture consecutively through the stages of (1) mixing the mixture in a vessel by agitation and thereby rendering it more uniform and (2) passing the resulting mixture through a different vessel which contains a mass of discrete, substantially spherical grinding elements while kinetically activating these elements by rotating an agitator within said vessel and thereby diminuting the solid constituents therein and producing fresh surfaces thereof, (3) producing a heterogeneous reaction at the interfaces between the solid and fluid constituents of said heterogeneous mixture by spreading the mixture into a film and incorporating air therein and removing volatile matter, (4) collecting and mixing the mixture in a different vessel by agitation and thereby rendering it more uniform and (5) passing the resulting mixture again through the vessel with discrete, substantially spherical grinding elements and further diminuting it and producing additional fresh surfaces of the grinding elements and spreading the resulting heterogeneous mixture into a film and incorporating air therein; and repeating said stages until a product of desired properties is obtained.

6. Apparatus for processing a heterogeneous flowable mixture of constituents used to manufacture chocolate comprising an integrated system of interconnected components including (1) at least one mixing vessel incorporating agitating means, (2) at least one diminuting vessel containing a mass of discrete, substantially spherical grinding elements and rotatable agitator means within said vessel for kinetically activating said elements and (3) means for spreading said mixture into a film and for contacting air with the film, and means for repeatedly circulating said mixture through said vessels and spreading means in series for repeated consecutive mixing, diminution and fluid treatment.

7. The apparatus of claim 6 which includes in the system, directing means between (1) the diminuting means and (2) the mixing and aerating means, which directing means is for circulating constituents through either (1) or (2) without recirculating through the other.

8. The apparatus of claim 6 which includes two mixing and aerating means, means for conveying the mixture from the diminuting means to one of the mixing and spreading means, and from there back to the diminuting means and from there to the other mixing and spreading means and from there back to the diminuting means.

9. The apparatus of claim 6 which includes means for recirculating the mixture through the mixing and spreading means without passing it through the diminuting means.

10. The apparatus of claim 6 which includes means for recirculating the mixture through the diminuting means without passing it though the mixing and spreading means.

11. The apparatus elements of claim 6 which are all enclosed as a unit.

12. Apparatus for processing a heterogeneous flowable mixture of constituents used to manufacture chocolate comprising an integrated system of interconnected components including two mixing vessels each containing agitating means, one diminuting vessel containing a mass of discrete, substantially spherical grinding elements and rotatable agitator means within said vessel for kinetically activating said elements, and means for spreading said mixture coming from said diminuting vessel into a film with means for aerating it; and means for conveying the mixture from the first of said mixing vessels into the diminuting vessel and spreading means and from there to the other mixing vessel, and from there again through the diminuting vessel and spreading means, and from there back to the first of said mixing vessels.

* * * * *

PO-1050
(5/69)

UNITED STATES PATENT OFFICE
CERTIFICATE OF CORRECTION

Patent No. __3,628,965__ Dated __December 21, 1971__

Inventor(s) __Adolf Maurits Nijkerk__

It is certified that error appears in the above-identified patent and that said Letters Patent are hereby corrected as shown below:

Correct the name of the Assignee, which should be Wiener & Co. N.V., and not Weiner & Co. N.V. as in the headnote of the patent.

Column 6, line 25, "time" should be -- one --

Signed and sealed this 31st day of October 1972.

(SEAL)
Attest:

EDWARD M. FLETCHER, JR.
Attesting Officer

ROBERT GOTTSCHALK
Commissioner of Patents